United States Patent

Nakamura et al.

[15] 3,661,344

[45] May 9, 1972

[54] MAGNETIC RECORDING AND REPRODUCING DEVICE

[72] Inventors: Takahiro Nakamura, Neyagawa; Osahiko Yano, Kadoma; Hideki Sakumoto, Moriguchi, all of Japan

[73] Assignee: Matsushita Electric Industrial Co., Ltd., Osaka, Japan

[22] Filed: May 18, 1970

[21] Appl. No.: 38,359

[30] Foreign Application Priority Data

May 24, 1969 Japan....................................44-40299
May 24, 1969 Japan....................................44-40300
May 24, 1969 Japan....................................44-40301
May 24, 1969 Japan....................................44-40302
May 24, 1969 Japan....................................44-40303
May 24, 1969 Japan....................................44-40304

[52] U.S. Cl. ................................................242/199, 274/4 C
[51] Int. Cl...................G03b 1/04, G11b 15/32, G11b 23/04
[58] Field of Search..................242/192, 197, 200; 226/180, 226/186; 274/4 B–4 E, 11 C

[56] References Cited

UNITED STATES PATENTS 2,944,825 7/1960 MacSinger..............................274/4 B
3,113,708 12/1963 Moulic, Jr..............................226/181
3,520,495 7/1970 Sotani....................................242/192

*Primary Examiner*—Leonard D. Christian
*Attorney*—Stevens, Davis, Miller & Mosher

[57] ABSTRACT

A magnetic recording and reproducing device of the cartridge loading type utilizing for its operation a movement of the magnetic tape magazine in which a magnetic tape is wound on a reel at the time the cartridge is inserted in and removed from the device. Specifically, a video tape recorder adapted to be mounted with a tape magazine has a mechanism for drawing the tape out of the tape magazine and for bringing the tape into contact with a tape guide provided with a rotary magnetic head or with a stationary magnetic head in response to the movement of the tape magazine when it is inserted in the magnetic tape recorder, a mechanism for removing the magnetic tape from the tape guide, stationary magnetic head or the like and returning it into the magazine in response to the movement of the tape magazine when it is removed from the recorder, a mechanism for bringing the tape out of contact with the tape guide, stationary magnetic head or the like for reducing the friction exerted on the running tape when the tape is fast forwarded or rewound, and a mechanism for making it easy to insert the tape cartridge in and remove it from the tape recorder.

4 Claims, 8 Drawing Figures

Figure 1:
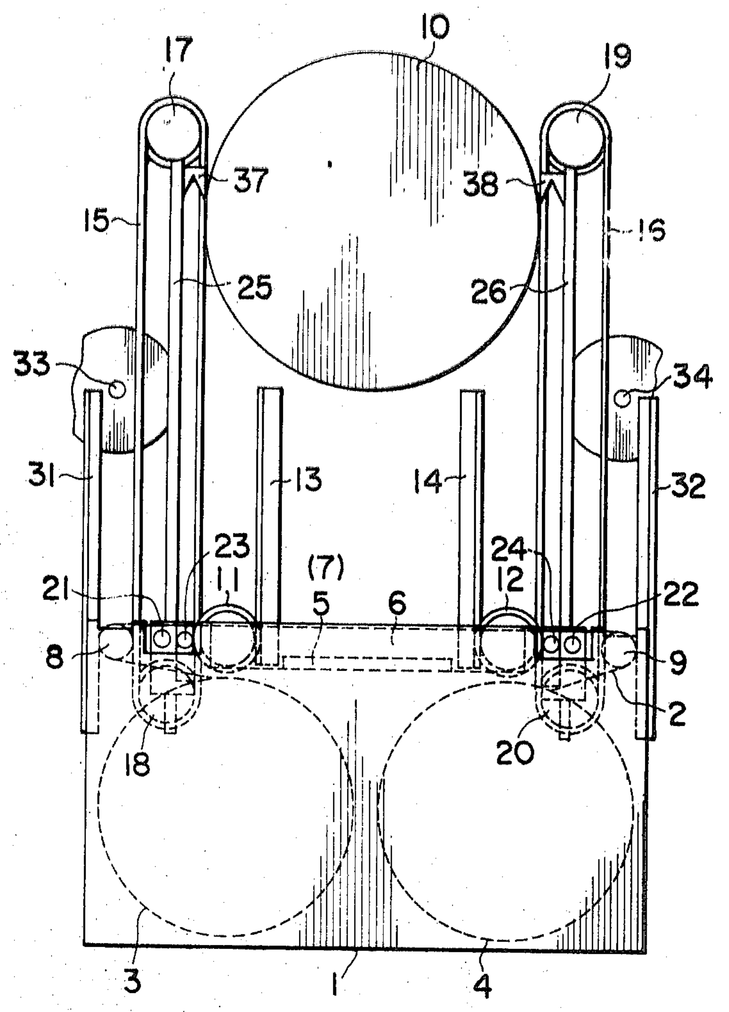

T. NAKAMURA,
O. YANO AND
H. SAKUMOTO
INVENTORS

BY Stevens, Davis, Miller & Mosher
ATTORNEYS

MAGNETIC RECORDING AND REPRODUCING DEVICE

The present invention relates to a magnetic recording and reproducing device utilizing for its operation a movement of the magnetic tape magazine in which a magnetic tape is wound on a reel at the time the magazine is loaded into and unloaded from the device.

In the conventional video tape recorder of the rotary head type, it has been considered impossible to make a tape magazine adapted to be loaded therein due to the complexity of the passage in which the tape runs. In view of such consideration, some tape recorders of the magazine loading type have been developed and manufactured but only for recorders in which the tape running passage is relatively simple such as in a sound tape recorder, data recorder and the like. Under the above-described disposition of the conventional video tape recorder of the rotary head type, an open reel has been required to be employed in the video tape recorder. In a video tape recorder employing an open reel, there are disadvantages as follows. The magnetic tape wound on the open reel is liable to be unwound and is inconvenient to handle. A large area of the tape is exposed and, accordingly, is liable to be damaged by being scratched or coated with dust, which results in dropping out in reproduced images and degradation in the quality of the images. Furthermore, since the tape running passage is complicated, it is difficult to load the tape into the recorder and the rotary magnetic head and the magnetic tape are likely to be subjected to damage. On account of the fact that the magnetic tape is always in contact with the rotary magnetic head and the tape guide having the rotary magnetic head therein at the time when the tape is rewound, fast forwarded and stopped, the service life of the rotary magnetic head and the magnetic tape is shortened. And since large driving power is required for feeding the tape when the tape is quickly forwarded or rewound, a large size driving motor should be provided and a large amount of electric power is consumed.

Therefore, the primary object of the present invention is to provide a magnetic recording and reproducing device including a tape guide having a rotary magnetic head therein, a tape magazine containing a magnetic tape wound on a reel, and a set of movable posts for drawing the magnetic tape out of the tape magazine and bringing it into contact with the tape guide, in which the magnetic tape is brought into contact with the tape guide and made to run therealong by the movable posts moved in response to the insertion movement of the tape magazine through an interlocking mechanism.

In accordance with the magnetic recording and reproducing device of the present invention as described above, are obtained such advantages as follows:

1. The magnetic tape is easily loaded in the complex tape running passage.

2. Since the recording and reproducing operations are performed in response to the insertion movement of the magnetic tape magazine, the device can be simply and quickly operated.

3. Since the magnetic tape is loaded in a tape magazine, the tape is able to be handled and carried with ease.

4. Even if the tape magazine is not in the position sufficiently near or to be engaged with the tape guide, the tape can be brought into correct contact with the tape guide. Thus, a tape magazine of special shape is not necessary for this recording device.

5. Since the tape is forwarded without being in contact with the rotary magnetic head when the tape is quickly forwarded and rewound, the tape and the rotary magnetic head are hardly abraded and the service life thereof is made long.

6. Since great driving power is not required for fast forwarding and rewinding of the tape, this invention is applicable for a video tape recorder of the type using a battery.

7. Since the output of the driving motor is not required to be large, the size and the price of the device are able to be reduced.

8. Sometimes the reel in the tape magazine happens to be rotated unexpectedly when the tape magazine is removed from the recording device. In order to prevent this undesired winding, a locking mechanism is employed in the device. Since the reel is made to be duly slipped on the reel supporting disk, the lock can be effected by a small amount of force. Accordingly, the construction of the locking mechanism can be simplified.

9. The loosening of the magnetic tape at the time the tape magazine is unloaded from the magnetic recording device is obviated by providing a simple mechanism in the device.

10. Since the loading and unloading operation of the tape magazine can be performed just by sliding the magazine sideward, it can be easily conducted with one hand.

11. Since the movable posts rise up in response to the loading and unloading movement of the tape magazine, the loading and unloading operation of the tape magazine can be easily performed.

12. Since the movable posts draw the magnetic tape out of the tape magazine and bring the tape into contact with the tape guide in response to the insertion movement of the tape magazine, the number of operating steps in recording and reproducing is reduced and the operation can be remarkably simplified.

13. There is no danger of damaging the magnetic tape at the time of loading and unloading of the tape magazine into and out of the recording device.

Figure 4:
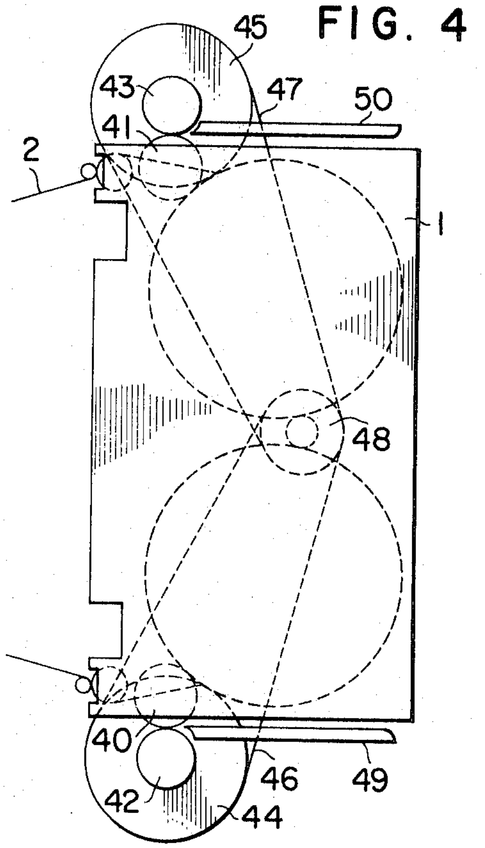
Figure 2:
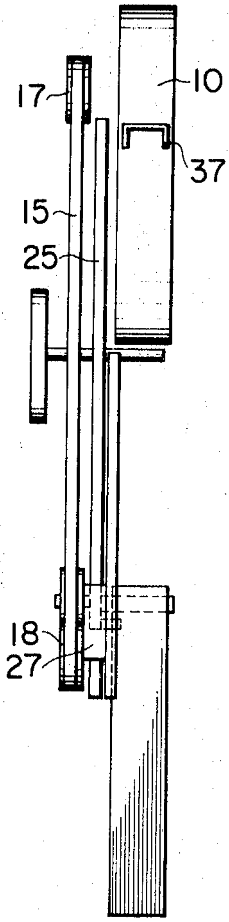
Figure 5:
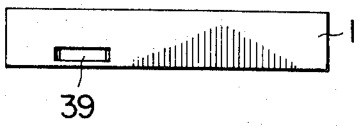
Figure 6:
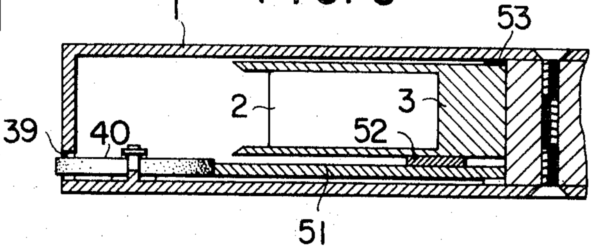
Figure 3:
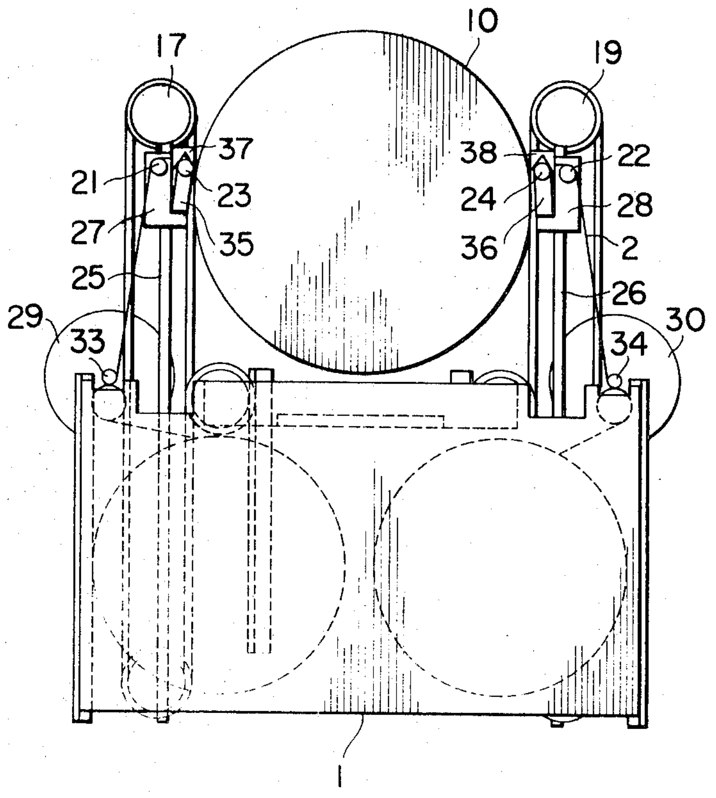
Figure 7:
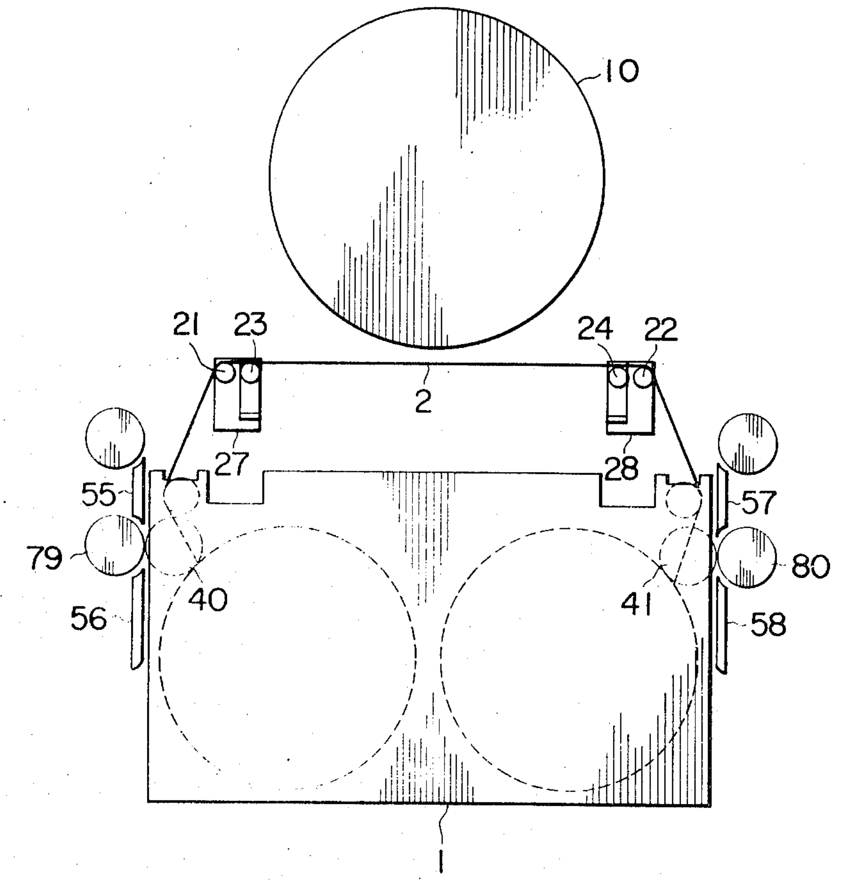
Figure 8:
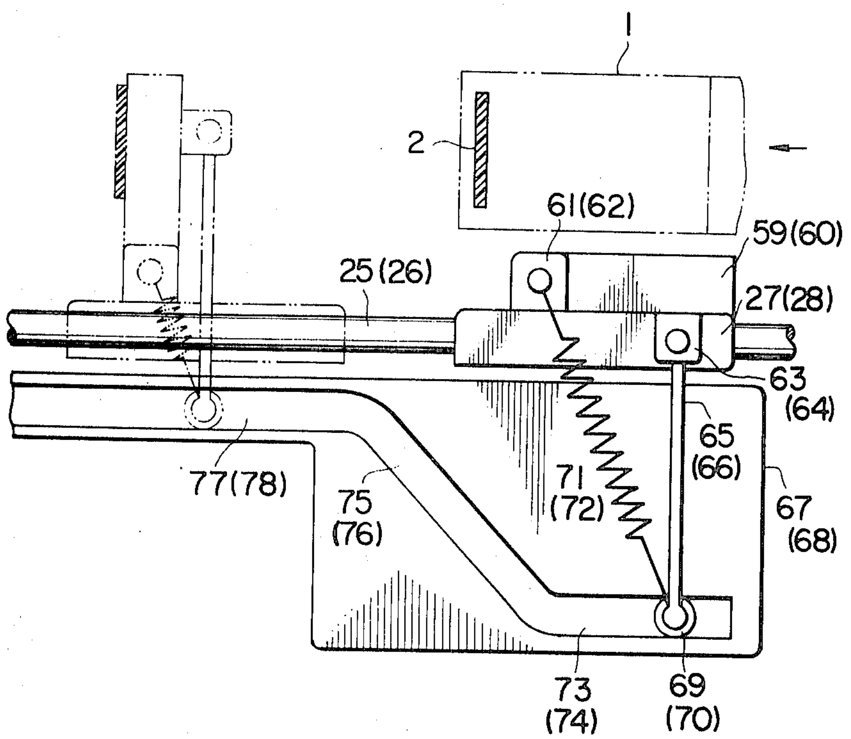

Now, the present invention will be described in detail with reference to an embodiment thereof taken in conjunction with the accompanying drawings in which:

FIG. 1 is a plan view of the recording device in accordance with the preferred embodiment of the present invention with the tape magazine about to be loaded thereinto, FIG. 2 is a side view of the recording device shown in FIG. 1, FIG. 3 is a plan view of the recording device shown in FIG. 1 with the tape magazine completely loaded thereinto, FIG. 4 is a plan view of the tape magazine adapted to be loaded into the recording and reproducing device in accordance with the present invention and of the tape take-up mechanism employed in the device, FIG. 5 is a side view of the tape magazine shown in FIG. 4, FIG. 6 is a sectional side view of the tape magazine shown in FIG. 4, FIG. 7 is a plan view of the recording and reproducing device in accordance with the present invention showing the movable posts and rollers for feeding the tape at the state of fast forwarding and rewinding operations, and FIG. 8 is an explanatory side view of the movable posts in the recording and reproducing device in accordance with the present invention showing the rising up and falling down positions thereof.

Now referring to the drawing, a tape magazine 1 in which a pair of reels 3 and 4 with a magnetic tape 2 wound thereon is provided with a recessed portion 5 to be engaged with a projected portion 7 provided on a tape magazine supporting plate 6. The magnetic tape 2 is strained between the reels 3 and 4 by way of a pair of pinch rollers 8 and 9. Reference numeral 10 indicates a tape guide which has a rotary magnetic head therein. The tape magazine supporting plate 6 is provided with a pair of toothed wheels 11 and 12 rotatably mounted thereto. The toothed wheels 11 and 12 are in meshing engagement with a pair of racks 13 and 14 respectively. The toothed wheels 11 and 12 are further in engagement with a pair of endless chains 15 and 16 respectively which run along a couple of pairs of sprocket wheels 17 and 18, and 19 and 20, respectively.

In the loading operation of the tape magazine 1 in the construction of the device as described above, in response to the insertion movement of the tape magazine 1 toward the tape guide 10, the toothed wheels 11 and 12 provided on the tape magazine supporting plate 6 moving toward the tape guide 10 are rotated in the clockwise and counterclockwise direction respectively in meshing engagement with the stationary racks 13 and 14 provided in the device. Due to the rotation of the toothed wheels 11 and 12 provided in the tape magazine 1, the chains 15 and 16 in engagement with the toothed wheels 11 and 12 are made to run along the sprocket wheels 17, 18, 19 and 20 at a speed twice as high as that of the insertion movement of the tape magazine 1.

The chains 15 and 16 are provided with movable post holders 27 and 28 secured thereto, respectively. The respective movable post holders 27 and 28 are provided with a pair of posts 21 and 22 having upper and lower flanges for controlling the lateral position of the tape 2 and a pair of posts 23 and 24 without flanges. The post holders 27 and 28 holding the above posts with flanges 21 and 22 and posts without flanges 23 and 24 are made to move along a pair of guide rails 25 and 26 extending between the sprocket wheels 17 and 18, and 19 and 20 and in parallel with the chains 15 and 16, so that the movable post holders 27 and 28 may move in the same direction as that in which the tape magazine 1 is moved in the insertion operation thereof. Thus, the movable posts 21, 22 and 23, 24 are moved from the cut away portions 29 and 30 of the tape magazine 1 toward the tape guide 10 at a speed twice as high as that of the insertion movement of the tape magazine 1 when the tape magazine 1 is inserted into the recording and reproducing device of the present invention. Reference numerals 31 and 32 indicate a pair of sliding rails for guiding the tape magazine 1 toward the right position in the device.

By selecting a movable distance of the movable posts 23 and 24 and the relative position of the tape guide with the chains 15 and 16, in the recording and reproducing device as described above so that the required length of the magnetic tape 2 is brought into contact with the periphery of the tape guide 10 by the movable posts 23 and 24 at the time when the tape magazine 1 is brought near the tape guide 10, it becomes possible to bring the magnetic tape 2 into correct contact with the tape guide 10 as shown in FIG. 3. The pinch rollers 8 and 9 provided in the tape magazine 1 are made to be abutted against a pair of capstans 33 and 34 with a prescribed pressure sandwiching the magnetic tape 2 therebetween when the tape magazine 1 is brought up to the loaded position near the tape guide 10. The movable posts without flanges 23 and 24 are mounted on arms 35 and 36 pivotally mounted on the movable post holders 27 and 28 so that the posts 23 and 24 may be slightly moved laterally on the holders 27 and 28. The pair of arms 35 and 36 are urged by a spring (not shown) so as to be out of contact with the tape guide 10 or the rotary magnetic head while the tape magazine 1 is moved inward or outward. In the vicinity of the opposite sides of the tape guide 10, there are provided a pair of position control members 37 and 38 which bring or guide the movable posts without flanges 23 and 24 into contact with the surface of the tape guide 10 so that the prescribed length of the magnetic tape 2 is brought into contact with the periphery of the tape guide 10.

When the tape magazine 1 is drawn or unloaded from the recording and reproducing device, the reverse steps are performed and the state shown in FIG. 1 is recovered. Then the tape magazine 1 can be taken out of the recording and reproducing device.

In the device as described hereinabove it is impossible to mount the reels on the reel table by dropping the reel vertically because the tape magazine is slid horizontally. In such a device, however, it is possible to perform a winding operation of the tape by providing a mechanism as shown in FIGS. 4 and 5. As clearly shown in FIGS. 4, 5 and 6 the tape magazine 1 is provided on the side walls thereof with a pair of openings 39 for exposing a part of a pair of rollers 40 and 41 rotatably mounted in frictional engagement with the reels in the tape magazine 1. A pair of idlers 42 and 43 for driving the reels are provided at the opposite sides of the tape magazine 1 in frictional engagement with the rollers 40 and 41. The pair of idlers 42 and 43 for driving the reels are driven by a driving pulley 48 through a pair of belts 46 and 47 and pulleys 44 and 45 coaxially secured thereto.

In the recording and reproducing device as described above, the magnetic tape 2 is not wound back on the reel completely when the tape magazine 1 is released or unloaded from its mounted condition on the tape guide 10 since the rollers 40 and 41 are removed from the idlers 42 and 43 due to the backward movement of the magazine 1. In order to accomplish this wind back of the tape at the time of unloading of the tape magazine 1 in this invention, a pair of side plates 49 and 50 are provided at the opposite sides of the tape magazine 1 as shown in FIG. 4 so that the rollers 40 and 41 may be brought into frictional engagement with the side plates when the tape magazine 1 is unloaded and the tape 2 may be wound back on the reels 3 and 4.

The rotating speed of the reels 3 and 4 should be varied according to the variation of the amount of the magnetic tape wound thereon and to the state of the device e.g. playback, fast forwarding, rewinding, etc., and accordingly, the ratio of the rotation of the rollers 40 and 41 to the rotation of the reels 3 and 4 should be varied. The mechanism for varying the ratio is shown in FIG. 6. The roller 40 is in frictional engagement with the periphery of a reel supporting disk 51 which is rotatably disposed in the tape magazine 1 in coaxial relation with the reel 3. The upper surface of the reel supporting disk 51 is in frictional contact with a felt member 52 secured to the lower flange of the reel 3. Since the friction coefficient between the upper surface of the reel supporting disk 51 and the lower surface of the felt member 52 can be properly determined by selecting the weight of the reel 3, the weight of the magnetic tape 2 wound on the reel 3, spring force of the spring 53 interposed between the upper flange of the reel 3 and the upper wall of the tape magazine 1 and the tension of the magnetic tape 2, the ratio of the rotation of the roller 40 to that of the reel 3 can be automatically varied at need. This is all the same for the other reel 4.

In the event that the magnetic tape 2 is quickly fed or rewound under the state that the magnetic tape 2 is in contact with the periphery of the tape guide 10 as shown in FIG. 3, the rotary magnetic head or the tape itself is abraded and a large amount of the tape driving force is required due to the friction of the magnetic tape with the tape guide 10, which requires a large size electric motor and a large amount of electric power. However, it becomes possible to quickly forward or rewind the magnetic tape with a small force by providing such a simple construction as shown in FIG. 7. An idler 79 for fast forwarding and an idler 80 for rewinding are provided at the position in the device where the rollers 40 and 41 are brought into frictional engagement with the former and the latter respectively when the tape magazine 1 is drawn outward to the extent that the magnetic tape 2 is brought out of contact with the tape guide 10. Accordingly, by driving either the idler 79 for fast forwarding or the idler 80 for rewinding at this position, the magnetic tape 2 can be fed or rewound with a small driving force and the tape and the magnetic head are prevented from being abraded. The side plates 55, 56, 57 and 58 shown in FIG. 7 have the same effect as that of the side plates 49 and 50 shown in FIG. 4.

It will be noted that in the above-described invention the tape magazine 1 should be inserted into the device after dropping it vertically therein in order to prevent the magnetic tape 2 from being intercepted by the erected posts 21, 23 and 22, 24 since the movable posts are erected. By providing a simple construction in the device, however, the tape magazine 1 can be made to be simply inserted horizontally into the device. This construction is shown in FIG. 8, in which the posts 59 and 60 are made to rise up and fall down so that the posts 59 and 60 may bring the magnetic tape into the device after rising up as shown with the dot and dash line in the drawing and may let the tape magazine pass over after falling down as shown with the solid line. The posts 59 and 60 are pivotally mounted on the movable post holders 27 and 28 at the pivotal portions 61 and 62. The movable post holders 27 and 28 are provided to be slid along the guide rails 25 and 26 as described above. A pair of arms 65 and 66 are pivotally mounted to the pivotal portions 63 and 64 of the posts 59 and 60. The arms 65 and 66 are provided at the lower end thereof with rotatable rollers 69 and 70 guided along a pair of auxiliary guide rails 67 and 68. A pair of tension springs 71 and 72 are strained between the pivotal portions 61 and 62 and the rotatable rollers 69 and 70 so that the rotatable rollers 69 and 70 may be urged toward the posts 59 and 60. Accordingly, when the rotatable rollers 69 and 70 are located in engagement with the horizontal lowered portions 73 and 74 of the auxiliary guide rails 67 and 68, the tension springs 71 and 72 are expanded and the posts are in the fallen down position as shown in FIG. 8 with the solid line. As the tape cartridge 1 is inserted into the device, the mechanism as described above is actuated and the rotatable rollers 69 and 70 are brought into the inclined portions 75 and 76 of the auxiliary guide rails 67 and 68 so as to make the posts 59 and 60 rise up. When the rotatable rollers 69 and 70 are brought up to the horizontal higher portions 77 and 78 of the auxiliary guide rails 67 and 68, the posts 59 and 60 are made to completely rise up as indicated with the dot and dash line in FIG. 8. During the above described process of the insertion operation of the tape magazine 1, the posts 59 and 60 draw the magnetic tape 2 out of the tape magazine 1. In the subsequent process of the insertion operation of the tape magazine 1 into the device, the magnetic tape 2 is brought into contact with the periphery of the tape guide 10 as described in detail in the preceding paragraphs. In the case of the drawing out operation of the tape magazine 1, the posts 59 and 60 perform a reversal movement of the above i.e. the posts fall down into the horizontal position from the vertically erected position. It should be understood that the mechanism for making the posts 59 and 60 rise up and fall down may be constructed in the different way from that shown in FIG. 8. For example, the auxiliary guide rails 67 and 68 or guide rails 25 and 26 may be partly formed into rack form so that the posts 59 and 60 having a gear mechanism may be made to rise up and fall down in response to the loading and unloading movement of the tape magazine 1 through the meshing engagement of the gearing mechanism of the posts with the rack portion of the rails.

What is claimed is:

1. In a magnetic recording and reproducing device comprising a tape guide including a rotary magnetic head therein, a tape magazine including a magnetic tape wound on a pair of reels mounted therein, and a pair of movable posts for moving said tape out of said tape magazine toward a pair of position control members disposed in the vicinity of said tape guide, the improvement which comprises means for moving said movable posts to bring said magnetic tape into contact with the periphery of said tape guide in response to the insertion movement of said tape magazine through an interlocking mechanical means, said means for moving said movable posts, including a toothed wheel provided on a plate moving together with said tape magazine in engagement therewith, and means for transmitting a driving force from said toothed wheel, wherein said movable posts are engaged with said means for transmitting a driving force, whereby said magnetic tape is brought into contact with the periphery of said tape guide by moving said movable posts by a longer distance than that said tape magazine is moved.

2. In a magnetic recording and reproducing device comprising a tape guide including a rotary magnetic head therein, a tape magazine including a magnetic tape wound on a pair of reels mounted therein, and a pair of movable posts for moving said tape out of said tape magazine toward a pair of position control members disposed in the vicinity of said tape guide, the improvement which comprises means for moving said movable posts to bring said magnetic tape into contact with the periphery of said tape guide in response to the insertion movement of said tape magazine through an interlocking mechanical means, wherein said tape magazine including a magnetic tape wound on a pair of reels therein is provided with an opening at the side walls thereof, a pair of rotatable members are provided in said tape magazine with a part thereof exposed therefrom through said openings, said reels being made to rotate with the rotation of said rotatable members, and a side plate is provided at the position where the exposed part of said rotatable member is brought into frictional contact therewith when said tape magazine is unloaded from said device, whereby the loosened magnetic tape is wound back onto the reel in response to the unloading operation of the tape magazine.

3. In a magnetic recording and reproducing device comprising a tape guide including a rotary magnetic head therein, a tape magazine including a magnetic tape wound on a pair of reels mounted therein, and a pair of movable posts for moving said tape out of said tape magazine toward a pair of position control members disposed in the vicinity of said tape guide, the improvement which comprises means for moving said movable posts to bring said magnetic tape into contact with the periphery of said tape guide in response to the insertion movement of said tape magazine through an interlocking mechanical means, wherein said tape magazine including a magnetic tape wound on a pair of reels therein is provided with openings at the side walls thereof, a pair of rotatable members are provided in said tape magazine with a part thereof exposed therefrom through said openings, said reels being made to rotate with the rotation of said rotatable members, and a driving rotatable member is disposed at a position where one of said pair of rotatable members provided in said tape magazine is brought into frictional contact therewith when said magnetic tape is removed from said tape guide by means of said movable posts moved in response to the movement of said tape magazine, whereby said magnetic tape is wound up by the frictional contact of said rotatable member with said driving rotatable member.

4. A magnetic tape magazine comprising a pair of reels for winding a magnetic tape thereon, means for providing a reel supporting disk coaxially with and rotatably with respect to said reel through a friction member interposed therebetween, a rotatable member disposed in frictional engagement with the periphery of said reel supporting disk, and an opening for exposing a part of said rotatable member out of said tape magazine, whereby said magnetic tape is made to be wound on said reel by rotating said rotatable member from outside said magazine.

* * * * *